United States Patent
Ishikawa et al.

(10) Patent No.: US 9,797,648 B2
(45) Date of Patent: Oct. 24, 2017

(54) REFRIGERATING AND AIR-CONDITIONING APPARATUS FOR USE IN A DEFROSTING OPERATION

(75) Inventors: Tomotaka Ishikawa, Tokyo (JP); So Nomoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 624 days.

(21) Appl. No.: 14/344,339

(22) PCT Filed: Sep. 13, 2011

(86) PCT No.: PCT/JP2011/005138
§ 371 (c)(1),
(2), (4) Date: Aug. 15, 2014

(87) PCT Pub. No.: WO2013/038439
PCT Pub. Date: Mar. 21, 2013

(65) Prior Publication Data
US 2014/0345309 A1 Nov. 27, 2014

(51) Int. Cl.
*F25D 21/00* (2006.01)
*F24F 11/00* (2006.01)
(Continued)

(52) U.S. Cl.
CPC ....... *F25D 21/004* (2013.01); *B60H 1/00899* (2013.01); *F24F 11/0086* (2013.01);
(Continued)

(58) Field of Classification Search
CPC ........ F25B 2313/0251; F25B 2313/025; F25B 2313/0214; F25B 47/02; F24F 3/065; F24F 2011/009; F24F 2011/0002
(Continued)

(56) References Cited

U.S. PATENT DOCUMENTS 3,103,794 A * 9/1963 Kyle .................. F25B 13/00
165/240
4,104,890 A * 8/1978 Iwasaki ............... F24F 5/0003
62/324.1
(Continued)

FOREIGN PATENT DOCUMENTS

JP 59-195045 A 11/1984
JP 04-363536 A 12/1992
(Continued)

OTHER PUBLICATIONS

JP H07-294070 translation.*
(Continued)

*Primary Examiner* — Frantz Jules
*Assistant Examiner* — Nelson Nieves
(74) *Attorney, Agent, or Firm* — Posz Law Group, PLC (57) ABSTRACT

A refrigerating and air-conditioning apparatus performs, even during a heating operation under air conditions leading to formation of frost, a defrosting operation while simultaneously continuing a heating operation and that improves comfort through heating by ensuring an appropriate amount of ventilation. A plurality of refrigeration cycles that are capable of independently performing a heating operation and a defrosting operation, are provided. A ventilation damper of an indoor unit in which a refrigeration cycle that performs a defrosting operation is installed is closed during a defrosting operation, and a ventilation damper of an indoor unit in which a refrigeration cycle that performs a heating operation is installed is controlled to achieve a required amount of ventilation corresponding to the indoor ventilation state.

11 Claims, 4 Drawing Sheets

(51) Int. Cl.
  *F25D 21/06* (2006.01)
  *B60H 1/00* (2006.01)
  *F25B 47/02* (2006.01)
  *F25B 13/00* (2006.01)
  *F24F 1/00* (2011.01)

(52) U.S. Cl.
  CPC ............ *F25B 13/00* (2013.01); *F25B 47/025* (2013.01); *F25D 21/06* (2013.01); *B60H 2001/00942* (2013.01); *F24F 1/0003* (2013.01); *F24F 2001/0051* (2013.01); *F24F 2011/0016* (2013.01); *F24F 2011/0089* (2013.01); *F25B 2313/0231* (2013.01); *F25B 2313/0233* (2013.01); *F25B 2600/2519* (2013.01)

(58) Field of Classification Search
  USPC .......................................................... 62/151
  See application file for complete search history.

(56) References Cited

U.S. PATENT DOCUMENTS

| | | | | |
|---|---|---|---|---|
| 4,105,064 A * | 8/1978 | Del Toro | ................ | F24F 3/065 165/233 |
| 4,157,649 A * | 6/1979 | Bussjager | ............... | F25B 13/00 62/160 |
| 4,259,847 A * | 4/1981 | Pearse, Jr. | ................ | F24F 1/02 236/1 E |
| 4,332,137 A * | 6/1982 | Hayes, Jr. | ............... | F25B 13/00 62/151 |
| 4,679,411 A * | 7/1987 | Pearse, Jr. | ................ | F24F 1/02 62/428 |
| 5,276,630 A * | 1/1994 | Baldwin | ................. | F24F 11/00 62/126 |
| 6,161,764 A * | 12/2000 | Jatnieks | ................. | F24F 3/044 165/249 |
| 6,318,096 B1 * | 11/2001 | Gross | ................... | F24F 11/0076 165/249 |
| 2004/0134218 A1 * | 7/2004 | Alexandre | ............. | F25B 13/00 62/324.5 |
| 2010/0107681 A1 * | 5/2010 | Morimoto | ............. | F24F 1/0059 62/498 |
| 2012/0103005 A1 * | 5/2012 | Kopko | ................... | F25B 1/047 62/430 |

FOREIGN PATENT DOCUMENTS

| | | |
|---|---|---|
| JP | 05-016803 A | 1/1993 |
| JP | 07-043051 A | 2/1995 |
| JP | 07-294070 A | 11/1995 |
| JP | 07-332817 A | 12/1995 |
| JP | 08-175161 A | 7/1996 |
| JP | 2000-320876 A | 11/2000 |
| JP | 2005-090784 A | 4/2005 |
| JP | 2006-116981 A | 5/2006 |
| JP | 2008-064381 A | 3/2008 |
| JP | 2009-198099 A | 9/2009 |
| JP | 4346429 B2 | 10/2009 |
| JP | 2011-099672 A | 5/2011 |

OTHER PUBLICATIONS

Office Action dated Sep. 11, 2015 in the corresponding CN application No. 201180073429.8 (with English translation).
Office Action dated Oct. 21, 2014 for the corresponding JP application No. 2013-533336 (and English translation).
Extended European Search Report dated Apr. 20, 2015 issued in corresponding EP patent application No. 1872176.0.
International Search Report of the International Searching Authority dated Dec. 6, 2011 for the corresponding international application No. PCT/JP2011/005138 (and English translation).
Office Action dated Jan. 4, 2017 issued in corresponding EP patent application No. 11 872 176.0.

* cited by examiner

REFRIGERATING AND AIR-CONDITIONING APPARATUS FOR USE IN A DEFROSTING OPERATION

CROSS REFERENCE TO RELATED APPLICATION

This application is a U.S. national stage application of PCT/JP2011/005138 filed on Sep. 13, 2011, the contents of which are incorporated herein by reference.

TECHNICAL FIELD

The present invention relates to a refrigerating and air-conditioning apparatus by a vapor-compression refrigeration cycle, and in particular, to a refrigerating and air-conditioning apparatus that is capable of, even during a heating operation under air conditions leading to formation of frost, performing a defrosting operation while simultaneously continuing the heating operation.

BACKGROUND

As a refrigerating and air-conditioning apparatus which includes a plurality of refrigeration cycles and which is capable of performing a defrosting operation while simultaneously continuing a heating operation, for example, there has been an in-vehicle air-conditioning apparatus described in Patent Literature 1. With the arrangement in which a refrigeration cycle which performs defrosting by a cooling operation and a refrigeration cycle which continues a heating operation are individually provided within the vehicle, the in-vehicle air-conditioning apparatus is able to perform a defrosting operation while simultaneously continuing a heating operation.

Furthermore, as an in-vehicle air-conditioning apparatus described in Patent Literature 2, a technique to maintain comfort by adjusting the amount of ventilation according to a vehicle occupancy, is disclosed.

PATENT LITERATURE

Patent Literature 1: Japanese Unexamined Patent Application Publication No. 2006-116981 (Claim 1, FIG. 1)

Patent Literature 2: Japanese Patent No. 4346429 (Claim 1)

In Patent Literature 1, an indoor heat exchanger of the refrigeration cycle that performs a heating operation is caused to act as a condenser, while an indoor heat exchanger of the refrigeration cycle that performs a defrosting operation is caused to act as an evaporator. Then, air passing through each of the indoor heat exchangers is sucked by a shared indoor fan, is mixed within the casing of the indoor fan, and is blown out into the room as conditioned air. Therefore, there is a problem that the blow-out air temperature may be lowered, causing discomfort to passengers. Furthermore, because the air is blown to an outdoor heat exchanger (evaporator) by operating an outdoor fan during the defrosting operation, the condensing temperature may not rise when the outside air temperature is low, thereby causing a possibility that defrosting is not performed.

Furthermore, during the defrosting operation while performing the heating operation, it is preferred that the room is ventilated with an appropriate amount of ventilation. In Patent Literature 2, although ventilation during a cooling operation is considered, ventilation during a defrosting operation is not particularly considered.

SUMMARY

The present invention has been made in view of the above problems. Therefore, it is an object of the present invention to provide a refrigerating and air-conditioning apparatus which is capable of, even during a heating operation under air conditions leading to formation of frost, performing a defrosting operation while simultaneously continuing a heating operation and which improves comfort through heating by ensuring an appropriate amount of ventilation.

A refrigerating and air-conditioning apparatus according to the present invention includes a plurality of refrigeration cycles that each include a compressor, a four-way valve, an outdoor heat exchanger, a pressure reducing device, and an indoor heat exchanger that are connected to one another, the plurality of refrigeration cycles being capable of independently performing a heating operation and a defrosting operation; an outdoor unit that includes the compressor, the four-way valve, and the outdoor heat exchanger; a plurality of indoor units that each include the ventilation port, a ventilation damper for opening and closing the ventilation port, an indoor fan for taking in outside air through the ventilation port and blowing the air into a room, and the indoor heat exchanger, the plurality of indoor units being installed in a same room; and a controller that maintains the ventilation damper of the indoor unit of a refrigeration cycle that performs a defrosting operation in a closed state during the defrosting operation and that controls the ventilation damper of the indoor unit in which a refrigeration cycle that performs a heating operation is installed to achieve a required amount of ventilation corresponding to a ventilation state of the room.

According to the present invention, it is possible to perform a defrosting operation while simultaneously continuing a heating operation by providing a plurality of refrigeration cycles that are capable of performing a heating operation and a defrosting operation independently. In addition, in the defrosting operation, the outside air is not introduced by closing a ventilation damper of an indoor unit of the defrosting operation side. Therefore, it is possible to suppress a drop in the indoor temperature during the defrosting operation. Furthermore, in an indoor unit of the heating operation side, by controlling a ventilation damper to open and close a ventilation port so that the required amount of ventilation is achieved in accordance with the indoor ventilation state, it is possible to ensure an appropriate amount of ventilation even during defrosting.

DETAILED DESCRIPTION

Hereinafter, preferred embodiments of a refrigerating and air-conditioning apparatus according to the present invention will be described, with reference to the accompanying drawings.

Embodiment 1

(Refrigerant Circuit Configuration)

Figure 1:
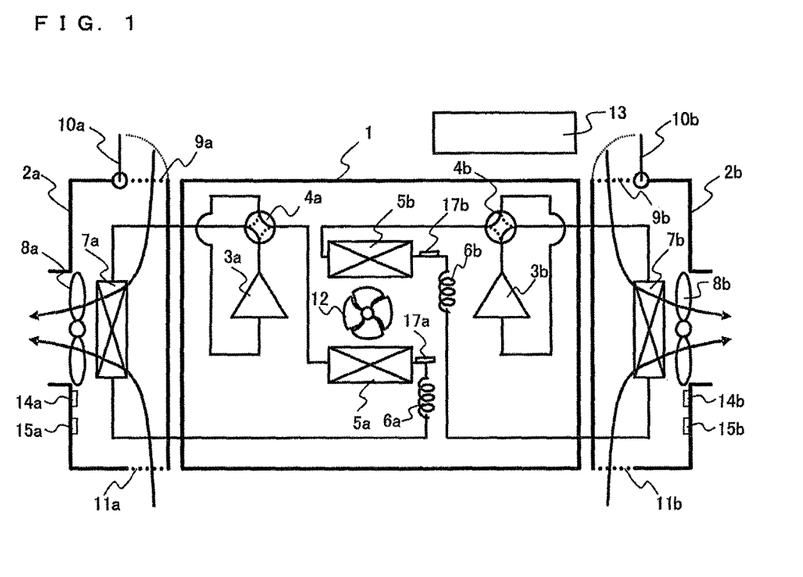
FIG. 1 is a refrigerant circuit diagram of a refrigerating and air-conditioning apparatus according to Embodiment 1 of the present invention.
Figure 2:
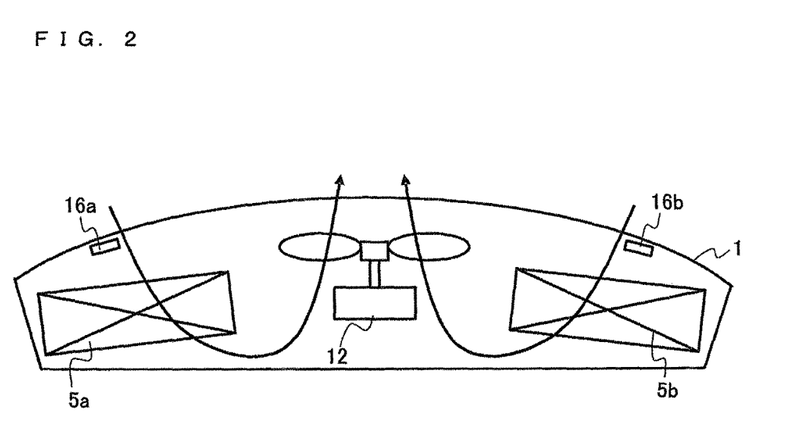
FIG. 2 is a schematic cross-sectional view of an outdoor unit in FIG. 1.

FIG. 1 is a refrigerant circuit diagram of a refrigerating and air-conditioning apparatus according to Embodiment 1 of the present invention. FIG. 2 is a schematic cross-sectional view of an outdoor unit in FIG. 1. In FIGS. 1 and 2 and the figures described below, objects with the same reference numerals are referred to as being equal to or corresponding to one another, which is common throughout the full text of the description.

The refrigerating and air-conditioning apparatus according to Embodiment 1 is, for example, used as an in-vehicle air-conditioning apparatus, and includes an outdoor unit 1, and indoor units 2a and 2b which are installed in the same room. A first refrigeration cycle is configured including the outdoor unit 1 and the indoor unit 2a, and a second refrigeration cycle is configured including the outdoor unit 1 and the indoor unit 2b.

The first refrigeration cycle includes a compressor 3a, a four-way valve 4a, an outdoor heat exchanger 5a, a pressure reducing device 6a, and an indoor heat exchanger 7a, which are sequentially connected by pipes, and is configured so that a refrigerant is able to circulate through the first refrigeration cycle. The first refrigeration cycle is configured to be capable of switching the operation mode between a cooling operation (defrosting operation) and a heating operation by the four-way valve 4a switching the flow path of the refrigerant discharged from the compressor 3a. The indoor unit 2a, in which part of the first refrigeration cycle is arranged, includes the indoor heat exchanger 7a, an indoor fan 8a, a ventilation port 9a to take in the outside air, a ventilation damper 10a which has an opening and closing feature for opening and closing the ventilation port 9a, and an air inlet 11a for indoor air.

The second refrigeration cycle includes a compressor 3b, a four-way valve 4b, an outdoor heat exchanger 5b, a pressure reducing device 6b, and an indoor heat exchanger 7b, which are sequentially connected by pipes, and is configured so that a refrigerant is able to circulate through the second refrigeration cycle. The second refrigeration cycle is configured to be capable of switching the operation mode between a cooling operation (defrosting operation) and a heating operation by the four-way valve 4b switching the flow path of the refrigerant discharged from the compressor 3b. The indoor unit 2b, in which part of the second refrigeration cycle is provided, includes an indoor heat exchanger 7b, an indoor fan 8b, a ventilation port 9b to take in the outside air, a ventilation damper 10b which has an opening and closing feature, and an air inlet 11b for indoor air.

In addition, the outdoor unit 1 includes an outdoor fan 12 for blowing the outside air into the outdoor heat exchanger 5a and the outdoor heat exchanger 5b.

Furthermore, the refrigerating and air-conditioning apparatus includes a controller 13 for controlling the switching of the operation modes by the four-way valves 4a and 4b, the opening and closing of the ventilation dampers 10a and 10b, and the operation of the indoor fans 8a and 8b and the compressors 3a and 3b. FIG. 1 illustrates the configuration of the refrigerating and air-conditioning apparatus which includes two refrigeration cycles. However, the refrigerating and air-conditioning apparatus may be configured to include a further plurality of refrigeration cycles. Moreover, the number of the indoor units installed is not limited to two, and a further plurality of indoor units may be installed.

(Sensor Configuration)

The indoor unit 2a includes, at an air inlet for the indoor air or inside the room, an indoor temperature sensor 14a for detecting the indoor temperature and an indoor humidity sensor 15a for detecting the indoor humidity. Similarly, the indoor unit 2b side also includes an indoor temperature sensor 14b for detecting the indoor temperature and an indoor humidity sensor 15b for detecting the indoor humidity.

The outdoor unit 1 includes, at the air inlet of the outdoor fan 12 or outside the apparatus, outside air temperature sensors 16a and 16b (see FIG. 2), for detecting the outside air temperature. Furthermore, the outdoor unit 1 includes a temperature sensor 17a for detecting the temperature of a pipe positioned between the outdoor heat exchanger 5a and the pressure reducing device 6a, and a temperature sensor 17b for detecting the temperature of a pipe positioned between the outdoor heat exchanger 5b and the pressure reducing device 6b.

Figure 3:
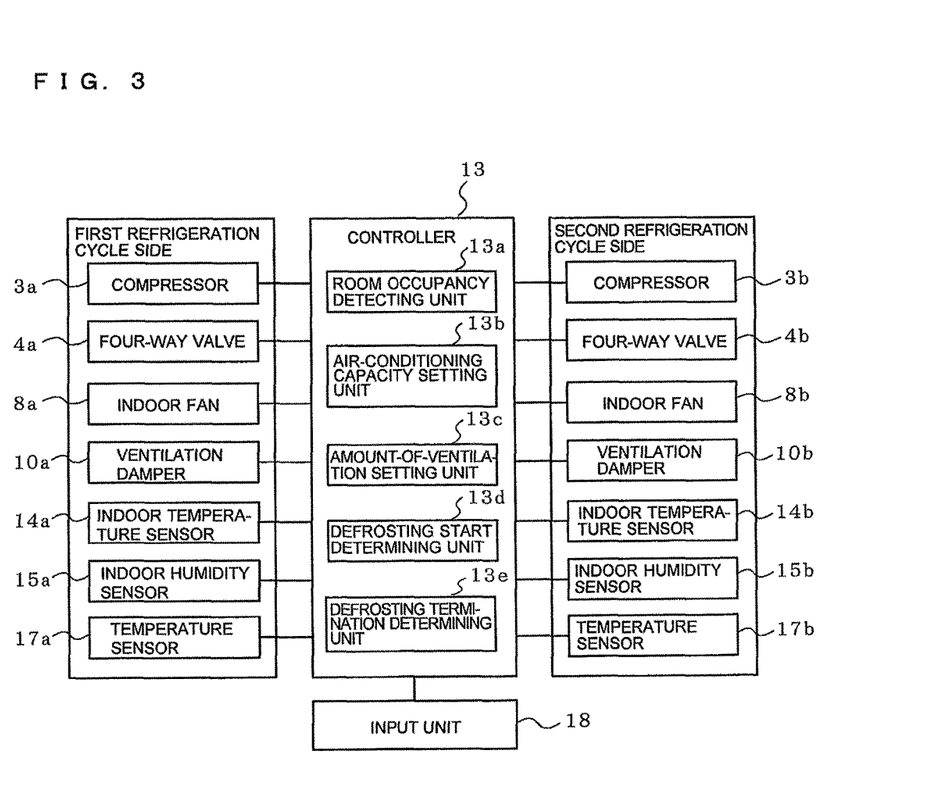
FIG. 3 is a control block diagram of the refrigerating and air-conditioning apparatus in FIG. 1.

FIG. 3 is a control block diagram of the refrigerating and air-conditioning apparatus in FIG. 1.

The controller 13 includes a CPU, a RAM for storing various data, and a ROM for storing a program for controlling the entire refrigerating and air-conditioning apparatus, programs for implementing operations in operation examples 1 to 4, described later, and the like (none of the CPU, the RAM, and the ROM are illustrated). With this configuration, a room occupancy detecting unit 13a, an air-conditioning capacity setting unit 13b, an amount-of-ventilation setting unit 13c, a defrosting start determining unit 13d, and a defrosting termination determining unit 13e are functionally configured in the controller 13.

The room occupancy detecting unit 13a detects the number of occupants in the room, based on information detected by a weight sensor (not illustrated), an image pickup device (not illustrated), or the like, provided in the room.

The air-conditioning capacity setting unit 13b detects the air-conditioning load based on the outside air temperature detected by the outside air temperature sensors 16a and 16b, the indoor temperature detected by the indoor temperature sensors 14a and 14b, and a preset indoor temperature. Based on the detected air-conditioning load, the air-conditioning capacity setting unit 13b sets a required air-conditioning capacity. The air-conditioning capacity setting unit 13b may also correct the required air-conditioning capacity on the basis of the number of occupants in the room detected by the room occupancy detecting unit 13a.

The amount-of-ventilation setting unit 13c detects ventilation load based on an output signal of an oxygen concentration sensor (not illustrated) or a carbon dioxide sensor (not illustrated), provided in the room, and sets a required amount of ventilation based on the detected ventilation load. The amount-of-ventilation setting unit 13c may estimate the required amount of ventilation based on the number of occupants in the room detected by the room occupancy detecting unit 13a. Setting of the amount of ventilation by the amount-of-ventilation setting unit 13c is performed repeatedly during the heating operation, and the required amount of ventilation is updated according to an index which represents an indoor ventilation state including the current air state and the number of occupants in the room.

Details of the defrosting start determining unit 13d and the defrosting termination determining unit 13e will be described later.

The compressor 3a, the four-way valve 4a, the indoor fan 8a, the ventilation damper 10a, the indoor temperature sensor 14a, the indoor humidity sensor 15a, and the temperature sensor 17a of the first refrigeration cycle side are connected to the controller 13. Furthermore, the compressor 3b, the four-way valve 4b, the indoor fan 8b, the ventilation damper 10b, the indoor temperature sensor 14b, the indoor humidity sensor 15b, and the temperature sensor 17b of the second refrigeration cycle side are also connected to the controller 13. Moreover, an input unit 18 for setting the indoor temperature and inputting and changing set values of various controls is also connected to the controller 13.

(Ventilation Operation)

Next, the operation of a ventilation operation in the refrigerating and air-conditioning apparatus of Embodiment 1 will be explained. The ventilation operation can be performed independently on indoor units 2a and 2b. The operations of the indoor units 2a and 2b are the same. Therefore, a ventilation operation will be explained hereinafter, with the operation of the indoor unit 2a.

The ventilation operation is an operation for taking in the outside air through the ventilation port 9a by operating the indoor fan 8a and opening the ventilation damper 10a so that the air is supplied into the room. The ventilation damper 10a repeatedly alternates between the opening and closing operations, and the amount of ventilation is controlled by the control of the opening and closing rate (the ratio of an opening time to one cycle of opening and closing) of the opening and closing operations by the ventilation damper 10a. In the ventilation operation, the opening and closing rate is determined so that the amount of ventilation (the required amount of ventilation) set by the amount-of-ventilation setting unit 13c is ensured on a time average basis, and by performing the opening and closing operations for the ventilation damper 10a according to the opening and closing rate, the required amount of ventilation is ensured on a time average basis. The amount-of-ventilation setting unit 13c may store in advance the amount of ventilation per predetermined time (for example, one second) while the ventilation damper 10a is open, and may determine the opening and closing rate based on the amount of ventilation, the duration of one cycle of opening and closing (for example, one minute), and the required amount of ventilation.

However, the control of the amount of ventilation is not limited to the above method and may also be performed in accordance with the opening ratio of the ventilation port 9a. The ventilation operation is controlled independently of a cooling operation and a heating operation, which will be described below. Accordingly, each of the first refrigeration cycle and the second refrigeration cycle may perform the ventilation operation while a cooling operation is being performed, or perform the ventilation operation while a heating operation is being performed. It should be noted that a defrosting operation and the ventilation operation are not performed at the same time. Furthermore, as described above, the amount-of-ventilation setting unit 13c updates the required amount of ventilation according to the indoor ventilation state. Therefore, by a ventilation operation performed concurrently with a cooling operation and a heating operation, the room is maintained in a comfortable ventilation state during the cooling operation and the heating operation.

(Cooling Operation)

Next, the operation of a refrigeration cycle for a cooling operation in the refrigerating and air-conditioning apparatus of this embodiment will be explained. A four-way valve is switched to the dotted line side in FIG. 1 in the cooling operation. The first refrigeration cycle and the second refrigeration cycle are able to perform a cooling operation independently. The cooling operations of the first refrigeration cycle and the second refrigeration cycle are the same. Therefore, a cooling operation will be explained hereinafter, with the cooling operation of the first refrigeration cycle.

In the cooling operation, the refrigerant compressed and heated in the compressor 3a flows into the outdoor heat exchanger 5a via the four-way valve 4a. The refrigerant which has flowed into the outdoor heat exchanger 5a is cooled and condensed by exchanging heat with the outside air blown by the outdoor fan 12. Then, the pressure of the refrigerant is reduced by the pressure reducing device 6a, and the refrigerant is heated and evaporates in the indoor heat exchanger 7a by exchanging heat with the indoor air blown by the indoor fan 8a. The refrigerant then flows into the compressor 3a, and completes one cycle. The room is cooled down by repeating the above-mentioned cycle continuously.

In the cooling operation, the air sucked into the indoor unit 2a by the indoor fan 8a is the mixed air of the outside air flowing in through the ventilation port 9a and the indoor air flowing in through the air inlet 11a, when the ventilation damper 10a is open. The mixed air cools down by exchanging heat with the indoor heat exchanger 7a, and is blown out into the room. When the ventilation damper 10a is closed, the indoor air which flows in through the air inlet 11a cools down by exchanging heat with the indoor heat exchanger 7a, and is blown out into the room.

(Heating Operation)

Next, the operation of a refrigeration cycle for a heating operation in the refrigerating and air-conditioning apparatus of Embodiment 1 will be explained. A four-way valve is switched to the solid line side in FIG. 1 in the heating operation. The first refrigeration cycle and the second refrigeration cycle are able to perform a heating operation independently. The heating operations of the first refrigeration cycle and the second refrigeration cycle are the same. Therefore, a heating operation will be explained hereinafter, with the heating operation of the first refrigeration cycle.

In the heating operation, the refrigerant compressed and heated in the compressor 3a flows into the indoor heat exchanger 7a via the four-way valve 4a. The refrigerant which has flowed into the indoor heat exchanger 7a is cooled and condensed by exchanging heat with the indoor air blown by the indoor fan 8a. Then, the pressure of the refrigerant is reduced by the pressure reducing device 6a, and the refrigerant is heated and evaporates in the outdoor heat exchanger 5a by exchanging heat with the outside air blown by the outdoor fan 12. The refrigerant then flows into the compressor 3a, and completes one cycle. The room is heated by repeating the above-mentioned cycle continuously.

In the heating operation, the air sucked into the indoor unit 2a by the indoor fan 8a is the mixed air of the outside air flowing in through the ventilation port 9a and the indoor air flowing in through the air inlet 11a, when the ventilation damper 10a is open. The mixed air cools down by exchanging heat with the indoor heat exchanger 7a, and is blown out into the room. When the ventilation damper 10a is closed, the indoor air which flows in through the air inlet 11a heats up by exchanging heat with the indoor heat exchanger 7a, and is blown out into the room.

(Defrosting Operation)

Next, the operation of a defrosting operation in the refrigerating and air-conditioning apparatus of Embodiment 1 will be explained. The first refrigeration cycle and the second refrigeration cycle are able to perform a defrosting operation independently. The defrosting operations of the first refrigeration cycle and the second refrigeration cycle are the same. Therefore, a defrosting operation will be explained hereinafter, with the defrosting operation of the first refrigeration cycle.

During a heating operation, when the outside air temperature is low and the evaporating temperature of the outdoor heat exchanger 5a is at or below 0 degrees Celsius, moisture contained in the outside air is frozen on the outdoor heat exchanger 5a, and frost is generated (formation of frost). When frost is formed on the outdoor heat exchanger 5a, the air flow decreases due to clogging of the fins, and furthermore, since the heat transmission is impeded by the frost layer, the amount of heat gained from the outside air decreases and the heating capacity is thus reduced. Therefore, a defrosting operation to melt the frost on the outdoor heat exchanger 5a is performed on a regular basis.

The defrosting start determining unit 13d determines whether or not defrosting of the outdoor heat exchanger 5a in the refrigeration cycle needs to start in the heating operation. Regarding the determination as to whether or not defrosting needs to be performed, for example, it is determined that defrosting needs to start when the saturation temperature, that is, the evaporating temperature, of the refrigerant in the outdoor heat exchanger 5a is at or below 0 degrees Celsius and the difference between the outside air temperature and the evaporating temperature is equal to or greater than a predetermined temperature difference (for example, 15 degrees Celsius). Furthermore, if the amount of frost formation can be estimated in advance, the heating operation time may be measured, and the determination as to start of defrosting may be made using a timer. The determination by the defrosting start determining unit 13d as to whether or not defrosting needs to start is not limited to the methods described above. In addition, for example, a reduction in the amount of cooing or the amount of frost formation of the outdoor heat exchanger 5a may be detected and the determination may be made based on the result of the detection.

The defrosting termination determining unit 13e determines whether a defrosting operation is to be terminated. Regarding the determination as to whether a defrosting operation is to be terminated, for example, when the temperature detected by the temperature sensor 17a has reached a predetermined temperature (for example, 10 degrees Celsius), it is determined that frost on the outdoor heat exchanger 5a has melted and that defrosting is to be terminated. Furthermore, if the amount of defrosting can be estimated in advance, the defrosting operation time may be measured and the determination as to termination of defrosting may be made using a timer. The determination by the defrosting termination determining unit 13e as to termination of defrosting is not limited to the methods described above. In addition, for example, recovery of the amount of cooling or the amount of frost formed on the outdoor heat exchanger 5a may be detected, and the determination may be made based on the result of the detection.

In performing a defrosting operation, there is no heating capacity in the refrigeration cycle that performs the defrosting operation. Therefore, if one of the two refrigeration cycles enters a defrosting operation, the other refrigeration cycle performs a heating operation, so that indoor heating continues to be performed. Furthermore, during the defrosting operation, a ventilation damper on the defrosting operation side is closed and a ventilation damper on the heating operation side is controlled to achieve a required amount of ventilation in accordance with the indoor ventilation state. As described above, by closing the ventilation damper on the defrosting operation side during a defrosting operation, a drop in the room temperature and an increase in the heating load caused by introduction of outside air can be prevented. Furthermore, ventilation continues to be performed by controlling the ventilation damper on the heating operation side during the defrosting operation.

A defrosting operation includes off-cycle defrosting and reverse defrosting. The operations of the off-cycle defrosting and the reverse defrosting will be described below. Here, the first refrigeration cycle will be explained by way of example.

(Off-Cycle Defrosting)

The off-cycle defrosting is an operation for defrosting using heat of the outside air by stopping the compressor 3a, operating the outdoor fan 12, and blowing the outside air to the outdoor heat exchanger 5a when the outside air temperature is above a predetermined temperature. When the outside air is at or above 0 degrees Celsius, frost melts. Therefore, the predetermined temperature may be set to about 5 degrees Celsius to ensure melting. The off-cycle defrosting is excellent in energy saving since the compressor 3a is stopped. Furthermore, since the indoor heat exchanger 7a does not act as an evaporator unlike reverse defrosting, which will be described later, the room temperature can be prevented from dropping. That is, when the outside air temperature is above 5 degrees Celsius, off-cycle defrosting is effective in terms of energy saving.

(Reverse Defrosting)

When the outside air temperature is at 5 degrees Celsius or below, defrosting cannot be performed with off-cycle defrosting. Therefore, a reverse defrosting operation using the heat of refrigerant is performed. When explanation of reverse defrosting will be given with the first refrigeration cycle as an example, the reverse defrosting is an operation for defrosting using the condensing heat of refrigerant by switching the four-way valve 4a from a heating circuit to a cooling circuit, so that the refrigerant that has been compressed by the compressor 3a into a high-temperature and high-pressure state is caused to flow into the outdoor heat exchanger 5a.

In addition, although in the reverse defrosting a defrosting operation is generally performed by stopping the indoor fan 8a and the outdoor fan 12 (fan operation control 1), the indoor fan 8a and the outdoor fan 12 may be operated. For example, the indoor fan 8a may be operated when the heating load is smaller than or equal to a predetermined value and the indoor fan 8a may be stopped when the heating load is greater than the predetermined value (fan operation control 2). In the case where the indoor fan 8a is operated in the reverse defrosting, defrosting of the outdoor heat exchanger 5a can be achieved using the heat of the indoor air. Therefore, the defrosting time can further be shortened. Since cold air is blown when the indoor fan 8a operates, the indoor fan 8a should be operated only when the heating load is smaller than or equal to the predetermined value.

Furthermore, the outdoor fan 12 may be operated when the outside air temperature detected by the outside air temperature sensor 16a is at or above a predetermined value and the outdoor fan 12 may be stopped when the outside air temperature detected by the outside air temperature sensor 16a is below the predetermined value (fan operation control 3). In the case where the outdoor fan 12 is operated in the reverse defrosting, since a larger amount of heat can be acquired from the outside air with the other heating operation cycle, the heating capacity can be increased. Since the outside air at a low temperature impedes defrosting when the outdoor fan 12 operates, the outdoor fan 12 should be operated only when the outside air temperature is at or above the predetermined value.

Furthermore, reverse defrosting can be performed even when the outside air temperature is at or above 5 degrees Celsius. Since the compressor 3a is operated, the defrosting time can be shortened compared to off-cycle defrosting. Furthermore, in the case where the indoor fan 8a is operated with the reverse defrosting, since defrosting of the outdoor heat exchanger 5a can be achieved using the heat of the indoor air, the defrosting time can further be shortened.

(Defrosting Operation Control Operation)

Next, a defrosting operation control operation with ventilation load and heating load will be explained. Although repetitive explanation will be given, in the case where a defrosting operation is performed, since there is no heating capacity in the refrigeration cycle on the defrosting operation side, one of two refrigeration cycles performs defrosting and the other refrigeration cycle performs a heating operation. At this time, the ventilation damper on the defrosting operation side is closed. On the heating operation side, during the heating operation, control continues to be performed such that the ventilation damper is controlled to achieve a required amount of ventilation corresponding to the indoor ventilation state, regardless of whether or not the other refrigeration cycle is performing a defrosting operation.

With the operations described above, during the defrosting operation, by blocking the introduction of the outside air on the defrosting operation side, the refrigerating and air-conditioning apparatus is capable of preventing a drop in the room temperature and an increase in the heating load. Furthermore, by alternately performing defrosting between the first refrigeration cycle and the second refrigeration cycle, the defrosting operation can be achieved while ensuring the heating capacity. Moreover, on the heating operation side, the controller 13c updates the required amount of ventilation in accordance with the indoor ventilation state and the ventilation damper is controlled to achieve the required amount of ventilation. Therefore, on the heating operation side during the defrosting operation, a ventilation operation which substantially complements for the shortage of ventilation caused by stoppage of ventilation on the defrosting operation side is performed, thus enabling the room to be maintained in a comfortable ventilation state.

(Air-Conditioning Control Operation During Heating in Refrigerating and Air-Conditioning Apparatus)

Hereinafter, specific operation examples of an air-conditioning control operation during heating in a refrigerating and air-conditioning apparatus will be explained by way of multiple examples. Since a ventilation operation is performed in a heating operation but is not performed in a defrosting operation, discrimination between execution and non-execution of ventilation is described as (execution of ventilation) and (non-execution of ventilation) in FIGS. 4 to 7.

Operation Example 1

Figure 4:
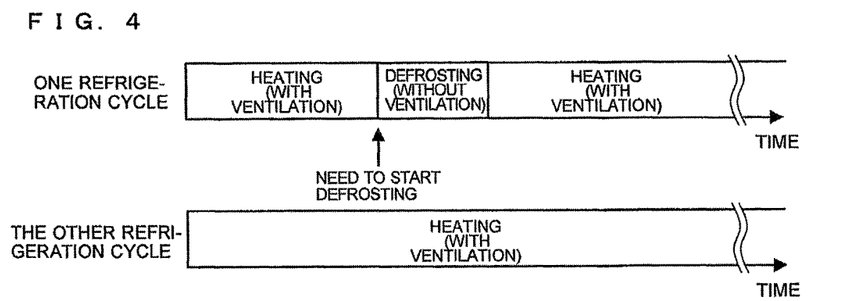
FIG. 4 is a timing chart of an operation example 1 of the refrigerating and air-conditioning apparatus according to Embodiment 1 of the present invention.

FIG. 4 is a timing chart for explaining the operation example 1 of an air-conditioning control operation during heating in the refrigerating and air-conditioning apparatus. The operation example 1 is an example of the case in which both the refrigeration cycles are performing a heating operation.

When both the first and second refrigeration cycles are performing a heating operation, in the case where the defrosting start determining unit 13d determines that defrosting of the outdoor heat exchanger 5a of one refrigeration cycle (here, for example, the first refrigeration cycle) needs to start, the first refrigeration cycle, for which it is determined that defrosting needs to start, closes the ventilation damper 10a to start a defrosting operation. During the period while the first refrigeration cycle is performing the defrosting operation, the other refrigeration cycle (here, for example, the second refrigeration cycle) continues to perform a heating operation. Although ventilation is not performed on the indoor unit 2a side since the ventilation damper 10a is closed during the defrosting operation, since the indoor unit 2b side that is performing a heating operation performs ventilation so as to substantially complement for the shortage of ventilation, the room is maintained in a comfortable ventilation state. Then, after terminating the defrosting operation, the first refrigeration cycle returns to a heating operation.

With the operations described above, a defrosting operation can be achieved while ensuring heating capacity. Therefore, a drop in the room temperature and a shortage of ventilation can be suppressed, thus enabling a high degree of comfort to be maintained.

Operation Example 2

Figure 5:
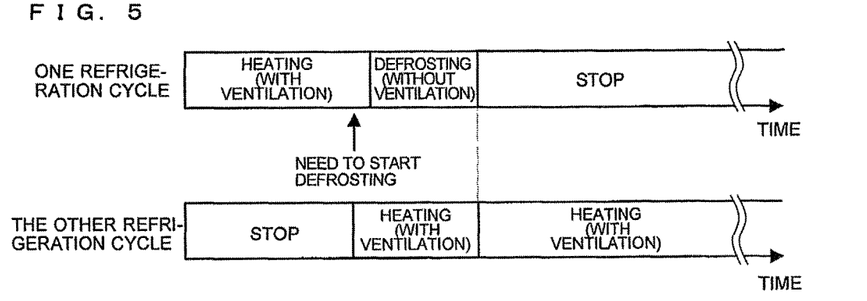
FIG. 5 is a timing chart of an operation example 2 of the refrigerating and air-conditioning apparatus according to Embodiment 1 of the present invention.

FIG. 5 is a timing chart for explaining the operation example 2 of the air-conditioning control operation during heating in the air-conditioning apparatus. The operation example 2 is an example of the case in which heating load is small, only one of the refrigeration cycles is performing a heating operation, and the other refrigeration cycle is stopped. Here, the case where the first refrigeration cycle is performing a heating operation and the second refrigeration cycle is stopped will be explained as an example.

In the case where it is determined by the defrosting start determining unit 13d that defrosting of the outdoor heat exchanger 5a of the first refrigeration cycle that is performing a heating operation needs to start, the stopped second refrigeration cycle is activated to start a heating operation. Then, a defrosting operation in the first refrigeration cycle that has been performing a heating operation starts. This is to avoid the occurrence of the situation in which heating operations in both the refrigeration cycles stop and indoor heating is thus not performed when the first refrigeration cycle enters a defrosting operation.

During the period up to the time at which the first refrigeration cycle terminates the defrosting operation, the second refrigeration cycle performs a heating operation so as to ensure the required heating capacity. Even after the termination of the defrosting operation by the first refrigeration cycle, the second refrigeration cycle continues to perform the heating operation. After terminating the defrosting operation, the first refrigeration cycle stops the operation.

With the operations described above, a drop in the indoor temperature during the defrosting operation can be suppressed, thus enabling comfort to be maintained. Furthermore, since one refrigeration cycle for which defrosting needs to be performed performs a defrosting operation and then stops and the other refrigeration cycle that has been stopped is caused to perform a heating operation in place of the one refrigeration cycle for which defrosting needs to be performed, the operation times of the refrigeration cycles can be equalized, thus achieving an effect of improving the reliability of the compressors.

Although the example in which two refrigeration cycles are provided has been illustrated here, the number of refrigeration cycles may be three or more, as stated above. In this case, when only one refrigeration cycle is performing a heating operation and all other refrigeration cycles are stopped, if it is determined that the refrigeration cycle that is performing the heating operation needs to start defrosting, the refrigeration cycle that has been determined to start defrosting may perform the operation of the first refrigeration cycle in FIG. 5 and any one of the stopped refrigeration cycles may perform the operation of the second refrigeration cycle in FIG. 5. Also at this time, the refrigeration cycle that has been stopped is operated so that the operation times of the compressors can be equalized.

In the operation example 2, when the refrigeration cycle that is performing a heating operation starts a defrosting operation, in order to avoid an operation state in which indoor heating is not performed, the stopped refrigeration cycle is driven to perform a heating operation. However, the operation example 2 is not limited to this. In an operation state in which at least one refrigeration cycle is stopped, for example, in an operation state in which there are five refrigeration cycles in total, three of the refrigeration cycles are performing a heating operation and the remaining two refrigeration cycles are stopped, in the case where it is determined that any one of the three refrigeration cycles that are performing a heating operation needs to start defrosting, either one of the two stopped refrigeration cycles may be driven to perform a heating operation.

Operation Example 3

Figure 6:
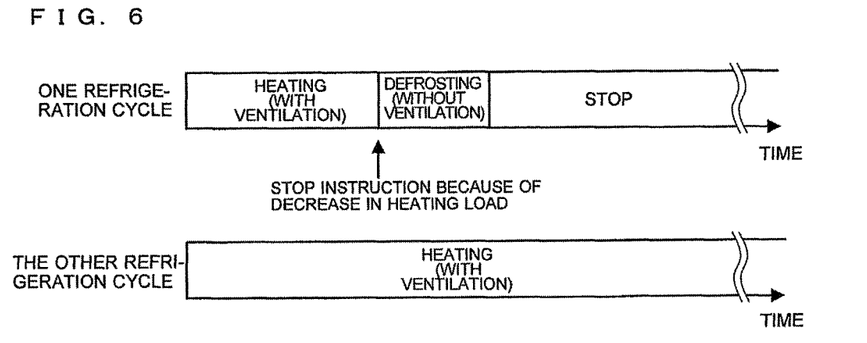
FIG. 6 is a timing chart of an operation example 3 of the refrigerating and air-conditioning apparatus according to Embodiment 1 of the present invention.

FIG. 6 is a timing chart for explaining the operation example 3 of the air-conditioning control operation during heating in the refrigerating and air-conditioning apparatus. The operation example 3 is an example of the case in which both the refrigeration cycles are performing a heating operation and a decrease in the heating load is detected by an air-conditioning load detecting unit.

In the case where the heating load decreases and the heating capacity of one refrigeration cycle is sufficient, one refrigeration cycle is stopped. At this time, after causing the refrigeration cycle that is to be stopped to perform a defrosting operation, the refrigeration cycle is stopped. Accordingly, for the next operation of the one of the stopped refrigeration cycles, a heating operation can be started in the state in which no frost is formed on the outdoor heat exchanger of the refrigeration cycle. Therefore, the heating operation time can be extended, and thus enabling comfort to be maintained for a long time.

The refrigeration cycle whose integrated operation time of the compressor is longer of the two refrigeration cycles may be selected as a refrigeration cycle to be stopped. Accordingly, the compressor operation times are equalized, and the reliability of the compressors can be improved. Although the example in which two refrigeration cycles are provided has been illustrated in the operation example 3, the number of refrigeration cycles may be three or more, as described above. In this case, when two or more refrigeration cycles are performing a heating operation, if it is determined that any one of the refrigeration cycles needs to start defrosting, the refrigeration cycle that has been determined to need to start defrosting may perform the operation of one refrigeration cycle in FIG. 6, and the other refrigeration cycle that is performing a heating operation may perform the operation of the other refrigeration cycle in FIG. 6.

Operation Example 4

Figure 7:
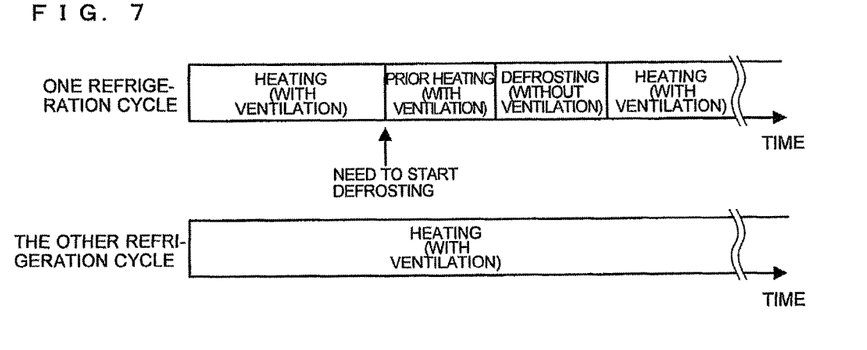
FIG. 7 is a timing chart of an operation example 4 of the refrigerating and air-conditioning apparatus according to Embodiment 1 of the present invention.

FIG. 7 is a timing chart for explaining the operation example 4 of the air-conditioning control operation during heating in the refrigerating and air-conditioning apparatus. The operation example 4 is an operation example applied to the case in which when heating load is large and one refrigeration cycle enters a defrosting operation, the heating capacity of only a heating operation of the other refrigeration cycle is not sufficient and the time-averaged required heating capacity cannot be ensured. Here, an example of the case in which it is determined that the first refrigeration cycle needs to start defrosting and the second refrigeration cycle continues to perform a heating operation will be explained.

When both the first and second refrigeration cycles are performing a heating operation, if it is determined by the defrosting start determining unit 13*d* that defrosting of the outdoor heat exchanger 5*a* of the first refrigeration cycle needs to start, the first refrigeration cycle that has been determined to need to start defrosting performs a preliminary heating operation before starting the defrosting operation. The preliminary heating operation is an operation to ensure the time-averaged required heating capacity including the period during which the defrosting operation is being performed, and an operation for controlling the rotation speed of the compressor 3*a* to achieve a heating capacity greater than the heating capacity in a normal heating operation, is performed. With the operations described above, even in the case where a defrosting operation is performed when the heating load is large, a defrosting operation can be achieved while ensuring the heating capacity. Therefore, a drop in the room temperature and a shortage of ventilation can be suppressed, thus enabling a high degree of comfort to be maintained.

Then, after terminating the preliminary heating operation, the first refrigeration cycle starts a defrosting operation. Although during the defrosting operation the indoor unit 2*a* side does not perform ventilation since the ventilation damper 10*a* is closed as described above, the indoor unit 2*b* side that is performing a heating operation performs ventilation so as to substantially complement for the shortage of ventilation. Therefore, the room is maintained in a comfortable ventilation state. Then, after terminating the defrosting operation, the first refrigeration cycle returns to heating (execution of ventilation).

Although the example in which two refrigeration cycles are provided has been explained as the operation example 4, the number of refrigeration cycles may be three or more, as described above. The operation of the operation example 4 in this case corresponds to an operation in the case where during the period while two or more of all the refrigeration cycles are performing a heating operation, when it is determined that any one of the refrigeration cycles needs to start defrosting, if the refrigeration cycle that has been determined to need to start defrosting enters a defrosting operation, the heating capacity of only the refrigeration cycle that is currently performing a heating operation is not sufficient. Therefore, the refrigeration cycle that has been determined to need to start defrosting may be caused to perform one refrigeration cycle in FIG. 7.

Next, control for causing a defrosting operation to be alternately performed between two refrigeration cycles in the refrigerating and air-conditioning apparatus of this example will be explained.

In order to cause defrosting to be alternately performed between two refrigeration cycles, a condition for starting a heating operation and starting the first defrosting operation may be set different between the refrigeration cycles. More specifically, a predetermined temperature difference between the outside air temperature and the evaporating temperature, which is used for a start determination in the defrosting start determining unit 13d, may be set different between the refrigeration cycles. In the above description, as the start determination condition for a defrosting operation, the temperature difference between the outside air temperature and the evaporating temperature is set at 15 degrees Celsius or above. This value is used for one refrigeration cycle, and for the other refrigeration cycle, for example, the temperature difference between the outside air temperature and the evaporating temperature is set to at or above 13 degrees Celsius. With this setting, the timing at which defrosting starts differs between the refrigeration cycles. Subsequently, defrosting operations will be started alternately.

In the refrigerating and air-conditioning apparatus, when defrosting operations by the refrigeration cycles are alternately started with equal intervals, a variation in the room temperature is reduced to minimum, thus improving comfort. However, since the interval between starts of defrosting operations varies according to the state of the outside air or the operation ratio of each refrigeration cycle, it may be difficult to cause defrosting operations to be performed alternately between the refrigeration cycles with equal intervals. In this case, during a period in which one refrigeration cycle is performing a defrosting operation or during a predetermined time T1 after returning from the defrosting operation to a heating operation, the other refrigeration cycle does not perform a defrosting operation even if it is determined by the defrosting start determining unit 13d that defrosting needs to start.

Namely, after the predetermined time T1 after one refrigeration cycle terminates defrosting and returns to a heating operation, the other refrigeration cycle performs a defrosting operation. Therefore, the defrosting operations of the refrigeration cycles are not simultaneously performed but are alternately performed, and a heating operation can be continued. In the case where a preliminary heating operation is performed before a defrosting operation in order to ensure the heating capacity, control is performed as described below.

That is, on the control, the longer one of the predetermined time T1 from returning to a heating operation after one refrigeration cycle terminates a defrosting operation and the execution time of a preliminary heating operation (defrosting start delay time) T2 may be selected. That is, in the case where the predetermined time T1 is shorter than the defrosting start delay time T2, by performing a preliminary heating operation, the feature in that a defrosting operation is not performed during the predetermined time T1 can be attained at the same time, and alternate defrosting operations between the refrigeration cycles can be achieved. In contrast, in the case where the predetermined time T1 is longer than the defrosting start delay time T2, after a preliminary heating operation is performed and start of a defrosting operation is further delayed by a difference time between the predetermined time T1 and the defrosting start delay time T2, the defrosting operation may be started.

Although the example in which two refrigeration cycles are provided has been described here, the number of refrigeration cycles may be three or more, as described above. In this case, during the time in which at least one of a plurality of refrigeration cycles is performing a defrosting operation or during the predetermined time T1 after returning from the defrosting operation to a heating operation, all the other refrigeration cycles may not perform a defrosting operation.

As described above, according to Embodiment 1, by providing a plurality of refrigeration cycles that are independent from one another, a defrosting operation can be achieved while simultaneously continuing a heating operation. Furthermore, in a defrosting operation, since the ventilation port of the indoor unit on the defrosting operation side is closed so that the outside air is not introduced, a drop in the room temperature during the defrosting operation can be suppressed. Furthermore, since in the indoor unit on the heating operation side, by opening or closing the ventilation port to control the ventilation damper to achieve the required amount of ventilation in accordance with the indoor ventilation state, an appropriate amount of ventilation can be ensured even in defrosting. Accordingly, even in a heating operation under air conditions leading to formation of frost, an appropriate amount of ventilation can be ensured, and the comfort through heating can be improved.

Furthermore, since the indoor heat exchangers 7a and 7b and the indoor fans 8a and 8b of the plurality of refrigeration cycles are separately arranged in the indoor units 2a and 2b and the indoor fan of the indoor unit that is performing a defrosting operation is stopped, conventional discomfort caused by a drop in the air outlet temperature in the case where air passing through the indoor heat exchanger of a defrosting operation side and air passing through the indoor heat exchanger on a heating operation side are mixed together in indoor units and the air is blown into the room can be prevented.

Furthermore, in the case where there is a stopped refrigeration cycle among a plurality of refrigeration cycles, if it is determined that any one of the refrigeration cycles that is performing a heating operation needs to perform a defrosting operation, after driving the stopped refrigeration cycle to perform a heating operation, the refrigeration cycle that has been determined to need to perform a defrosting operation is caused to start a defrosting operation. Accordingly, a drop in the indoor temperature during a defrosting operation can be suppressed, thus enabling comfort to be maintained.

Furthermore, when two or more refrigeration cycles of a plurality of refrigeration cycles are performing a heating operation, to stop the heating operation of one refrigeration cycle for a certain reason, for example, a decrease in the heating load, the refrigeration cycle that is to be stopped is caused to perform a defrosting operation and is then stopped. Accordingly, for the next operation of the stopped refrigeration cycle, a heating operation can be started in the state in which no frost is formed on the outdoor heat exchanger. Therefore, the heating operation time can be extended, thus enabling comfort to be maintained for a long time.

Furthermore, in the case where a preliminary heating operation for ensuring the time-averaged required heating capacity including the period during which the defrosting operation is being performed is performed before performing the defrosting operation and the defrosting operation is started after the preliminary heating operation, the defrosting operation can be achieved while ensuring the heating capacity. Therefore, a drop in the room temperature and a shortage of ventilation can be suppressed, thus enabling a high degree of comfort to be maintained.

Embodiment 2

(Injection Circuit)

Figure 8:
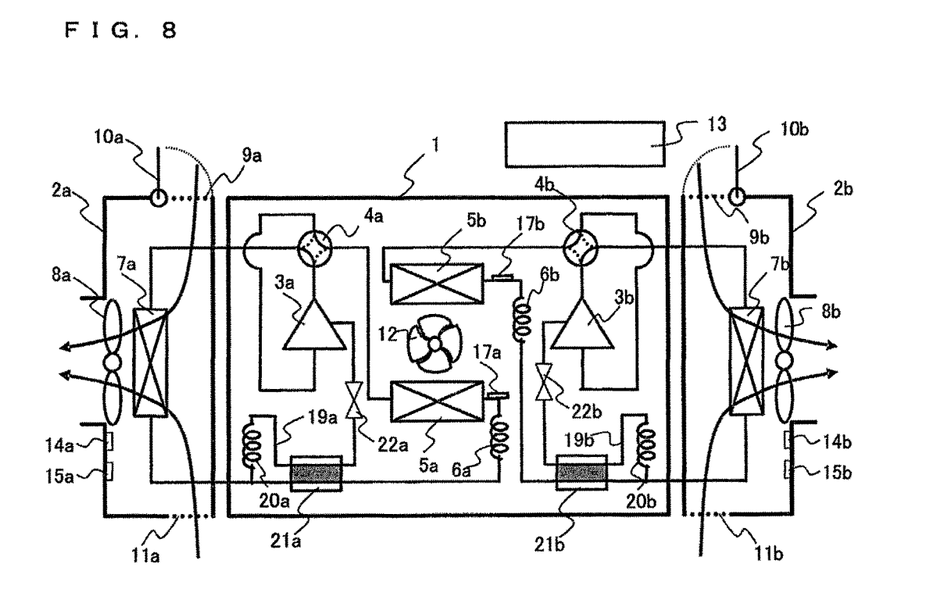
FIG. 8 is a refrigerant circuit diagram of a refrigerating and air-conditioning apparatus according to Embodiment 2 of the present invention.

A refrigerating and air-conditioning apparatus according to Embodiment 2 is different from Embodiment 1 in the configuration of a refrigerant circuit.

FIG. 8 is a diagram illustrating a refrigerant circuit of the refrigerating and air-conditioning apparatus according to Embodiment 2 of the present invention. The configuration and control of portions other than the refrigerant circuit are basically similar to those of the refrigerating and air-conditioning apparatus of Embodiment 1. Hereinafter, features of Embodiment 2 that are different from Embodiment 1 will be mainly explained. A variation applied with respect to the configuration and control similar to those in Embodiment 1 is also applied to Embodiment 2 in a similar manner.

The refrigerant circuit of the refrigerating and air-conditioning apparatus of Embodiment 2 includes a bypass pipe 19a that branches off between the indoor heat exchanger 7a and the pressure reducing device 6a and that reaches a compression chamber of the compressor 3a through a flow control unit 20a, an internal heat exchanger 21a, and a solenoid valve 22a, as well as the refrigerant circuit of the first refrigeration cycle of Embodiment 1. The internal heat exchanger 21a exchanges heat between a pipe positioned between the flow control unit 20a and the solenoid valve 22a in the bypass pipe 19a and a pipe positioned between the indoor heat exchanger 7a and the pressure reducing device 6a.

Similar to the refrigerant circuit of the first refrigeration cycle, the refrigerant circuit of the second refrigeration cycle includes a bypass pipe 19b that branches off between the indoor heat exchanger 7b and the pressure reducing device 6b and that reaches a compression chamber of the compressor 3b through the flow control unit 20b, the internal heat exchanger 21b, and the solenoid valve 22b, as well as the refrigerant circuit of the second refrigeration cycle of Embodiment 1. The internal heat exchanger 21b exchanges heat between a pipe positioned between the flow control unit 20b and the solenoid valve 22b in the bypass pipe 19b and a pipe between the indoor heat exchanger 7b and the pressure reducing device 6b.

(Cooling Operation)

Next, the operation of a cooling operation in the refrigerating and air-conditioning apparatus of Embodiment 2 will be explained. A cooling operation is performed when the solenoid valves 22a and 22b are closed. Accordingly, an operation as in Embodiment 1 is performed. The other operations are similar to those in Embodiment 1.

(Heating Operation)

Next, the operation of a heating operation in the refrigerating and air-conditioning apparatus of Embodiment 2 will be explained. In a heating operation, the solenoid valves 22a and 22b are opened to perform an injection operation. The injection operation allows the refrigerant flow rate of the compressors 3a and 3b to increase, and allows the compressor input, that is, the heating capacity, to increase. Furthermore, in the case where the outside air temperature is low, since the evaporating temperature drops and the compression ratio increases, the discharge temperature rises. However, an injection operation suppresses the discharge temperature, thus increasing the reliability of the compressors. Moreover, if the capacity of a compressor is variable, the capacity can be increased while suppressing the discharge temperature, thus significantly increasing the heating capacity.

As described above, in the refrigerating and air-conditioning apparatus of Embodiment 2, by performing an injection operation during a heating operation, the heating capacity can be increased. Therefore, for example, in the case where the first refrigeration cycle performs a defrosting operation and the second refrigeration cycle performs a heating operation, the advantages described below can be achieved. That is, by performing an injection operation in the second refrigeration cycle, the heating capacity during a defrosting operation can be ensured without the prior heating explained in Embodiment 1 being performed in the first refrigeration cycle.

(Defrosting Operation)

The operation of a defrosting operation in the refrigerating and air-conditioning apparatus of Embodiment 2 will now be explained. A defrosting operation is performed when the solenoid valves 22a and 22b are closed. Accordingly, an operation as in Embodiment 1 is performed. The other operations are similar to those in Embodiment 1.

According to Embodiment 2, advantages similar to those in Embodiment 1 are attained. In addition, in starting a defrosting operation in any one of refrigeration cycles in the refrigerating and air-conditioning apparatus, by performing an injection operation on a heating operation side, the required heating capacity can be ensured without performing a preliminary heating operation to ensure the time-averaged required heating capacity on the defrosting operation side.

Furthermore, in a situation in which one refrigeration cycle performs a heating operation while the other refrigeration cycle is performing a defrosting operation, for example, the outdoor fan 12 may be caused to be stopped, for example, when the outside air temperature is low. At this time, by performing an injection operation in the refrigeration cycle on the heating operation side, as described above, even if the evaporating temperature drops due to the stoppage of the outdoor fan 12, the heating capacity can be increased. Even in this case, the required heating capacity can be ensured without performing prior heating on the defrosting operation side. Therefore, when the outside air temperature is low, a defrosting operation which ensures the heating capacity can be achieved while suppressing a rise in the discharge temperature by injection, thus ensuring a high reliability.

Although the example in which two refrigeration cycles are provided is illustrated in FIG. 8, the number of refrigeration cycles may be three or more. Also in this case, similar operation effects can be achieved.

The invention claimed is:

1. A refrigerating and air-conditioning apparatus for use in a defrosting operation comprising:
    a plurality of refrigeration cycles that each include a compressor, a four-way valve, an outdoor heat exchanger, a pressure reducing device, and an indoor heat exchanger, the compressor, the four-way valve, the outdoor heat exchanger, the pressure reducing device, and the indoor heat exchanger being connected to one another, the plurality of refrigeration cycles being configured to independently perform a heating operation and a defrosting operation;

a plurality of indoor units in each of which the indoor heat exchanger for respective one of the refrigeration cycles is disposed, and that each include an indoor fan for taking in outside air through a ventilation port and blowing the air into a room and a ventilation damper that opens and closes the ventilation port; and a controller that controls the ventilation damper of each of the indoor units, wherein the plurality of indoor units are installed in a same room, the controller, when at least one of the refrigeration cycles performs defrosting operation and another at least one of the refrigeration cycles perform the heating operation, renders the ventilation damper to be in a closed state during the defrosting operation, and controls the ventilation damper of the indoor unit that performs the heating operation, and wherein the controller is configured to, activate a second refrigeration cycle of the plurality of refrigeration cycles from a stopped condition to start the heating operation, start the defrosting operation in a first refrigeration cycle of the plurality of refrigeration cycles after the second refrigeration cycle is activated to start the heating operation, terminate the defrosting operation and stop the compressor of the first refrigeration cycle after terminating the defrosting operation, and cause the second refrigeration cycle to continue the heating operation even after the first refrigeration cycle terminates the defrosting operation.

2. The refrigerating and air-conditioning apparatus for use in a defrosting operation of claim 1, wherein the controller is configured to perform the heating operation in a third refrigeration cycle and a fourth refrigeration cycle of the plurality of refrigeration cycles, start the defrosting operation in the third refrigeration cycle, while keeping the fourth refrigeration cycle in the heating operation, terminate the defrosting operation of the third refrigeration cycle, and cause the third refrigeration cycle to stop after performing the defrosting operation.

3. The refrigerating and air-conditioning apparatus for use in a defrosting operation of claim 1, wherein the controller is configured to perform a preliminary heating operation to ensure a time-averaged required heating capacity, including a period during which the defrosting operation is being performed, by controlling the refrigeration cycle that is to perform a defrosting operation to control a heating capacity before performing the defrosting operation, and start the defrosting operation after termination of the preliminary heating operation.

4. The refrigerating and air-conditioning apparatus for use in a defrosting operation of claim 1, wherein the controller is configured to control the four-way valve to cause a refrigerant to flow in a direction opposite a direction in which a refrigerant flows during the heating operation, as the defrosting operation.

5. The refrigerating and air-conditioning apparatus for use in a defrosting operation of claim 4, wherein the controller, in the defrosting operation, is configured to stop the indoor fan of the indoor unit of a refrigeration cycle that is to perform the defrosting operation, and stop an outdoor fan for blowing air to an outdoor heat exchanger that is to be subjected to defrosting.

6. The refrigerating and air-conditioning apparatus for use in a defrosting operation of claim 1, wherein the controller, in the defrosting operation, is configured to operate the indoor fan of the indoor unit of a refrigeration cycle that is to perform the defrosting operation, when a heating load is smaller than or equal to a predetermined value, and stop the indoor fan of the indoor unit when the heating load is greater than the predetermined value.

7. The refrigerating and air-conditioning apparatus for use in a defrosting operation of claim 1, further comprising:

an outside air temperature detecting sensor, wherein the controller, in the defrosting operation, is configured to operate an outdoor fan that blows air to the outdoor heat exchanger that is to be subjected to defrosting when an outside air temperature detected by the outside air temperature detecting sensor is at or above a predetermined value, and stop the outdoor fan that blows air to the outdoor heat exchanger that is to be subjected to defrosting when the outside air temperature detected by the outside air temperature detecting sensor is below the predetermined value.

8. The refrigerating and air-conditioning apparatus for use in a defrosting operation of claim 1, further comprising an outside air temperature detecting sensor, wherein when an outside air temperature detected by the outside air temperature detecting sensor is at or above a predetermined value, as the defrosting operation, the controller stops the compressor and operates an outdoor fan that blows air to the outdoor heat exchanger that is to be subjected to defrosting.

9. The refrigerating and air-conditioning apparatus for use in a defrosting operation of claim 1, further comprising:

a bypass pipe that branches off between the indoor heat exchanger and the pressure reducing device and that reaches a suction side of the compressor via a flow control unit; and an internal heat exchanger that exchanges heat between a refrigerant between the indoor heat exchanger and the pressure reducing device and a refrigerant that has passed through the flow control unit in the bypass pipe, wherein in the heating operation, part of the refrigerant between the indoor heat exchanger and the pressure reducing device is caused to flow into the bypass pipe and to be depressurized by the flow control unit, and after the depressurized refrigerant is subjected to heat exchange with the refrigerant between the indoor heat exchanger and the pressure reducing device in the internal heat exchanger, the depressurized refrigerant that has been subjected to heat exchange is injected to a compression chamber of the compressor.

10. The refrigerating and air-conditioning apparatus for use in a defrosting operation of claim 1, wherein the plurality of refrigeration cycles are configured to not start to perform the defrosting operation during a period in which at least one of the plurality of refrigeration cycles is performing a defrosting operation, or during a predetermined period of time after returning from the defrosting operation to a heating operation.

11. The refrigerating and air-conditioning apparatus for use in a defrosting operation of claim 1, wherein
when at least one of the refrigeration cycles performs the defrosting operation and another at least one of the refrigeration cycles performs the heating operation, the controller is configured to control the ventilation damper of the indoor unit that performs the heating operation to achieve a required amount of ventilation corresponding to the indoor ventilation state.

* * * * *